United States Patent [19]
Bouchu

[11] Patent Number: 4,672,895
[45] Date of Patent: Jun. 16, 1987

[54] DEVICE FOR CONTROLLING THE PRIMING OF A PYROTECHNIC DEVICE

[75] Inventor: Michel Bouchu, Soisy Sous Montmorency, France

[73] Assignee: Commissariat a l'Energie Atomique, Paris, France

[21] Appl. No.: 843,025

[22] Filed: Mar. 24, 1986

[30] Foreign Application Priority Data

Mar. 25, 1985 [FR] France .................. 85 04402

[51] Int. Cl.$^4$ ............................................. F42C 11/00
[52] U.S. Cl. ................................................ 102/206
[58] Field of Search ............... 102/202.5, 206, 200

[56] References Cited

U.S. PATENT DOCUMENTS

| Re. 23,328 | 2/1975 | Williams | 339/91 R |
| 3,675,578 | 7/1972 | Douglas et al. | 102/206 |
| 3,912,830 | 10/1975 | Murayama et al. | 427/100 |
| 3,973,195 | 8/1976 | Williams et al. | 324/72.5 |
| 4,414,901 | 11/1983 | Sellwood | 102/206 |

FOREIGN PATENT DOCUMENTS 444734 8/1942 Belgium .
50332 4/1982 European Pat. Off. .

OTHER PUBLICATIONS

Jain, V. K., et al.; "Thermally Stimulated Currents in Pure and Copper Doped Polyvinylacetate"; Thin Solid Films; vol. 48, No. 2; 1978.

Primary Examiner—Charles T. Jordan
Attorney, Agent, or Firm—James E. Nilles

[57] ABSTRACT

It comprises a detonator consisting of at least one charge and a system for igniting said charge, means for supplying a high voltage electric pulse to the detonator, means for positioning the detonator with respect to an explosive charge and for applying it to said charge. A control probe is positioned to the rear of the detonator and is applied thereto, said probe consisting of a film, having two faces, of a biaxially stretched polymer having a polarized zone and an electrode connected to each face of the polarized zone. Connection means connect each electrode to a measuring device.

6 Claims, 8 Drawing Figures

DEVICE FOR CONTROLLING THE PRIMING OF A PYROTECHNIC DEVICE

BACKGROUND OF THE INVENTION

The invention makes it possible to monitor the satisfactory priming of a pyrotechnic device.

For exploding a pyrotechnic device, such as an explosive charge, it is necessary to prime it, i.e. bring it to sufficiently high pressure and temperature conditions to enable the reaction to start. This is brought about by a detonator having an e.g. electric ignition system and one or more explosive charges which are less stable than the main explosive charge which it is wished to prime. This charge or these charges of the detonator generates shock waves, which prime the main charge.

However, there is at present no means making it possible to control the satisfactory operation of a priming chain of an explosive charge, said chain being constituted by a means for supplying a high voltage pulse, by an igniter and by one or more explosive charges arranged in cascade form.

Therefore, in the case when it is subsequently found that the explosive has functioned abnormally, it is not possible to establish the factor (electric pulse, priming chain or the actual explosive) which has led to this incorrect operation.

SUMMARY OF THE INVENTION

The invention relates to a device for controlling the priming of a pyrotechnic device making it possible to control the operation without disturbing the same.

More specifically, the present invention relates to a device for controlling the priming of a pyrotechnic device incorporating a detonator comprising at least one charge and a system for igniting said charge, means for supplying a high voltage electric pulse to the detonator, means for positioning the detonator with respect to an explosive charge and applying same to said charge, wherein a control probe is positioned to the rear of the detonator, and is applied against the same, said probe being constituted by a film, having two faces, of a biaxially stretched polymer having a polarized zone, an electrode connected to each face of the polarized zone and connection means for connecting each electrode to a measuring device.

Preferably, the biaxially stretched polymer is polyvinylidene fluoride (PVDF OR $PVF_2$).

Preferably, the probe also has an insulating coating on each of the faces of the film. This coating is e.g. of unpolarized PVDF.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
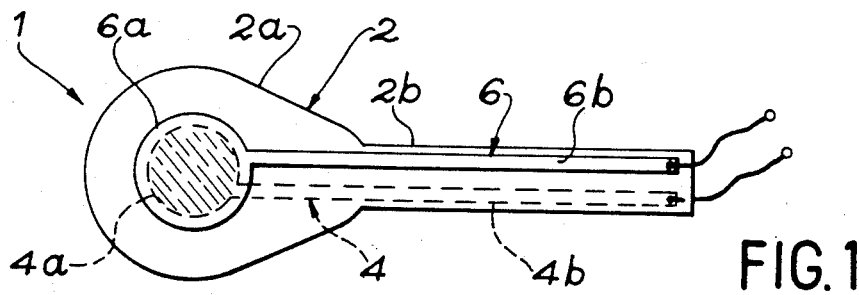
FIG. 1 A plan view of a diagnosis probe used in a device according to the invention.
Figure 2:
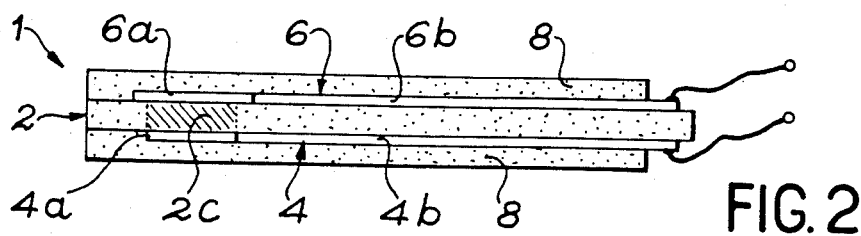
FIG. 2 A sectional view of the probe shown in FIG. 1.

The diagnosis probe shown in FIGS. 1 and 2 comprises a film 2 of biaxially stretched PVDF (polyvinylidene fluoride). Its thickness is 23 microns, but different thicknesses can be used. As can be seen in FIG. 1, the film has a zone 2a cut in substantially circular form and extended by a tongue 2b. An electrode 4 is formed on one surface of film 2 and an electrode 6 on the other surface of film 2. Electrodes 4 and 6 are deposited by cathodic sputtering and are made from a metal such as copper or aluminium. They have a thickness of approximately 1 micron. In plan view (cf. FIG. 1), each electrode is constituted by a circular zone 4a, 6a and a tongue 4b, 6b connected to said circular zone. The circular zones 4a, 6a of electrodes 4, 6 are positioned facing one another, but the diameter of one of the electrodes, e.g. 4 is smaller than that of the other. In the centre of film portion 2a, there is an active zone 2c obtained by a polarization of the biaxially stretched polyvinylidene fluoride.

The probe has means making it possible to connect each of the faces of the polarized zone 2c to a device for measuring the voltage supplied by said zone to the terminals of a resistive charge or ballast resistor 34. In the embodiment described, these means are constituted by electrodes 4a and 6a.

The polarized zone can be obtained by any appropriate process and particularly that described in French Pat. No. 2 538 157 relating to a process and apparatus for polarizing ferroelectric materials. According to this process, a very low frequency sinusoidal high voltage is applied between the two electrodes 4, 6. The polarized zone forms between these two electrodes, which results in a residual polarization of the polymer. The geometry of probe portion 2a is determined by the shape of electrodes 4a, 6a.

In the case where the probe is used in an electricity conducting medium, it is necessary to insulate it. It then has two polymer films, e.g. of polyvinylidene fluoride, which are not polarized on each of the two faces, which leads to an insulation of the electrodes. This operation is performed cold, without pressure and with a grease as the adjuvant. In the embodiment shown, the thickness of films 8 is 9 microns. It is also possible to use adhesive materials which have no impact ionization.

Figure 3:
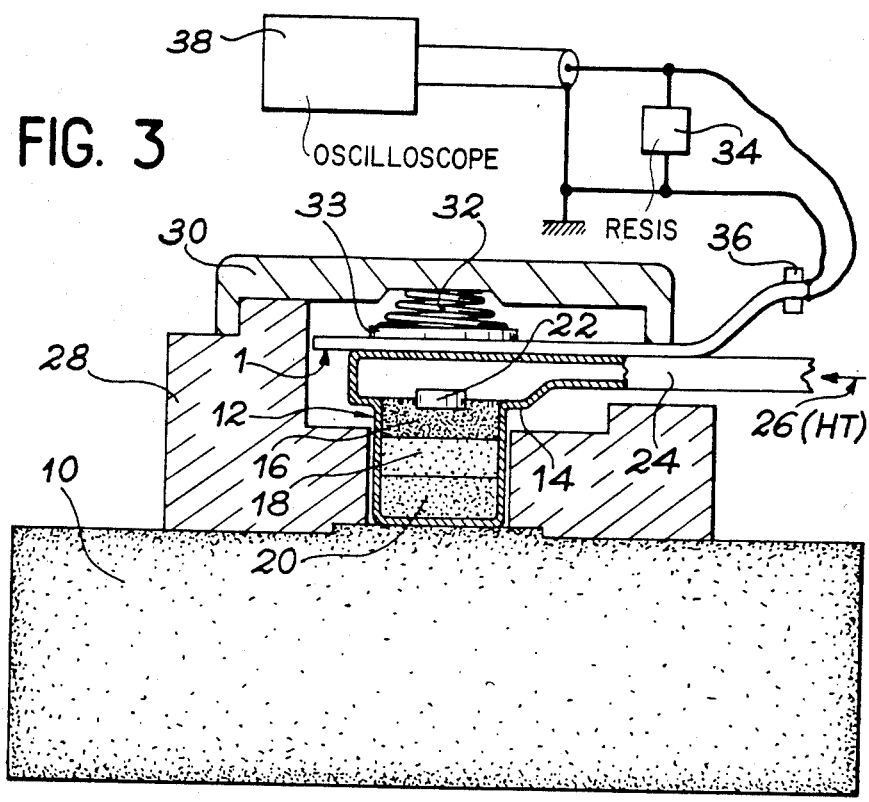
FIG. 3 An embodiment of a diagnosis device according to the invention.

FIG. 3 shows an example of the use of a diagnosis probe for the priming of an explosive charge according to the invention. An explosive charge 10 is primed by a detonator 12. The latter comprises a box 14, which contains three explosive charges 16, 18 and 20. Explosive charge 16 is primed by an ignition system 22. Box 14 has an outlet 24 for an electric cable for supplying a high voltage pulse to ignition system 22 and as indicated by arrow 26. When such a pulse is supplied, the ignition system 22 primes charge 16, which in turn primes charge 18 and finally charge 20, the latter priming the explosive 10.

The detonator is contained in a box 28 closed by a cover 30. A spring 32 between the cover and the detonator serves to engage the latter against the explosive charge, in order to ensure a good transmission of the shock wave produced by the detonator. It is desirable to be able to monitor the operation of detonator 12, so as to establish whether the priming chain of the explosive has functioned correctly.

For this purpose, a probe 1 according to the invention is introduced between spring 32 and the detonator box. A metal disk or pellet 33 is placed between the spring and the probe. Probe 1 is connected to a ballast resistor 34 via a connector 36. Resistor 34 e.g. has a value of 50Ω and is connected to a numerical or digital oscilloscope or to a transient voltage analyzer. Under the effect of the stress produced by the shock wave produced by each of the constituent parts of the detonator and then of the explosive charge 10, the residual polarization of the biaxially stressed polymer constituting film 2 varies:

$$P_3(t) = \Sigma j d_{3j} \sigma(t)$$

in which $P_3(t)$ is the variation of the residual polarization of film 2;

$d_{3j}$ being the components of the piezoelectric tensor and $\sigma(t)$ is the stress applied.

This variation of the residual polarization frees an electric charge quantity:

$$Q(t) = S P_3(t)$$

in which S represents the active surface of the polymer. These charges are recovered in resistor 34. The voltage obtained at the terminals of said resistor is given by the formula $$V(t) = R \frac{dQ(t)}{dt}$$

or $$V(t) = K \frac{d\sigma(t)}{dt}.$$

This leads to the chronometry of the phenomena involved in the priming device. The integration of the voltage signal gives:

$$Q(t) = \frac{1}{R} \int V(t) dt = K' \sigma(t).$$

The thus obtained curve represents the pressure profile of the shock wave.

Figure 4:
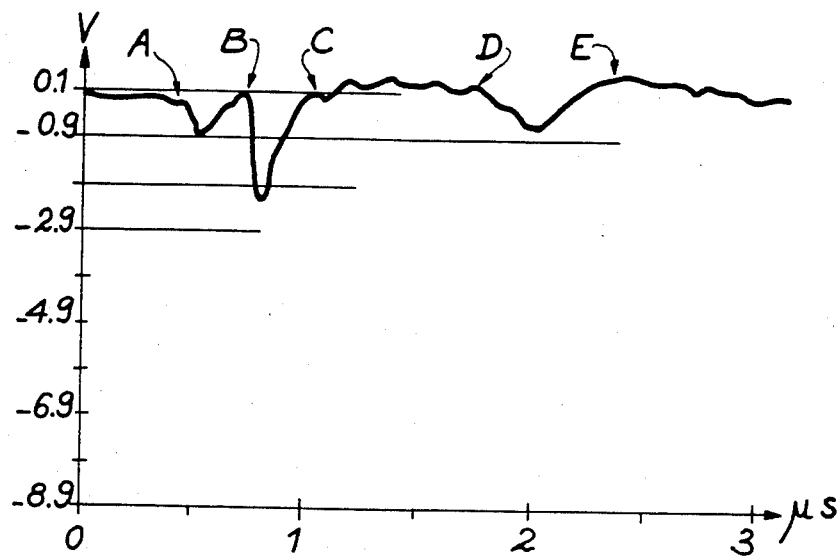
FIG. 4 A curve giving the electric signal supplied by the diagnosis probe as a function of time.
Figure 5:
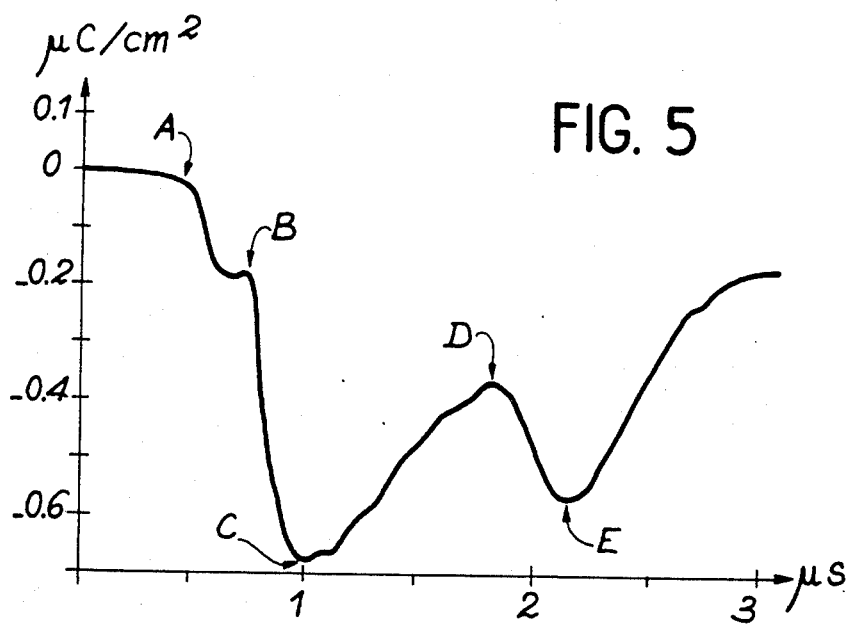
FIG. 5 A curve obtained by integrating the voltage supplied by the probe.

FIG. 4 shows the recording of the signal supplied by probe 1 and FIG. 5 the integral curve of said signal. On these curves are shown the different operating stages of detonator 12. The curve of FIG. 4 represents the evolution of the pressure profile of the shock wave during time, expressed in microseconds.

At A is recorded the shock produced by the ignition system 22 and the reaction start of explosive 16, then from A to B the operation of explosive 16, from B to C that of explosive 18, from C to D that of explosive 20 and a gas expansion due to the speeding up of that part of the detonator located in the vicinity of spring 32. From D to E there is a pressure increase due to the priming of explosive 10. As from point E, the pressure reduces as a result of cooling and the expansion of the gases produced by the explosion of explosive 10.

Figure 6:
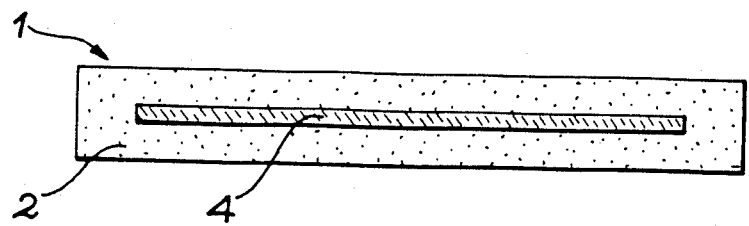
FIG. 6 A second embodiment of a diagnosis probe used in a device according to the invention.

Other diagnosis probe configurations are possible. FIG. 6 shows a second possible probe configuration. It is constituted by a single film tongue 2, on each of whose faces has been deposited a conductive metal strip forming an electrode, examples of said metal being copper or aluminium. Only one of these strips, namely strip 4 is visible in FIG. 6. A polarized zone is formed in the film in the area where the two electrodes face one another.

Figure 7:
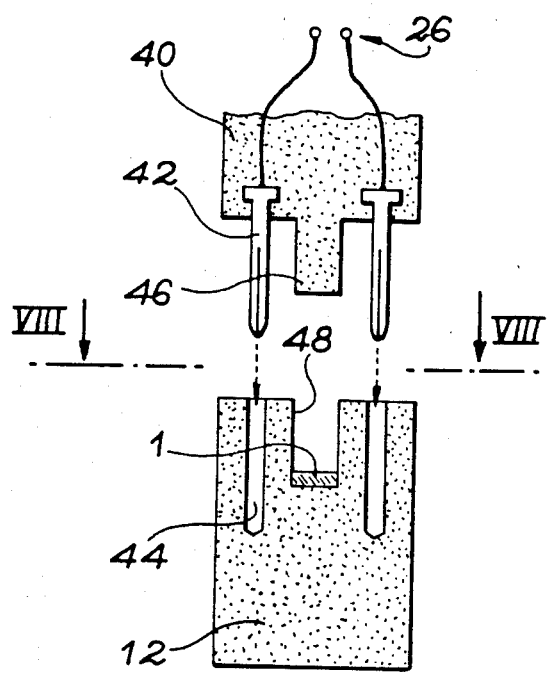
FIG. 7 A diagnosis device according to the invention using the probe of FIG. 6.
Figure 8:
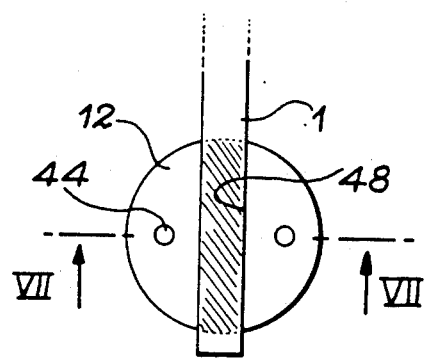
FIG. 8 A view along line VIII—VIII of FIG. 7.

FIG. 7 shows a detonator 12 with an ignition system and one or more not shown explosive charges. An electric cable 40 transmits a high voltage pulse to the detonator. Two pins 42 enter engagement inlets 44 of the detonator. A centring support 46, cooperating with a groove 48 in the detonator, ensures a correct centring of cable 40, which facilitates the introduction of pins 42. As can be seen in FIG. 8, which is a plan view of the detonator, the diagnosis probe of FIG. 6 is placed at the bottom of the slot. The electrodes of this probe are connected to a device for measuring the voltage supplied.

The control device described hereinbefore has several advantages. It forms an active probe, its operation not being linked with any external supply. This property gives it a very high degree of immunity to electrical interference, particularly the interference linked with the high voltage pulse necessary for the operation of ignition device 22.

In view of the fact that the probe is made from a flexible material of limited thickness, it has a high degree of mechanical flexibility. Due to the latter and the limited thickness, it can be inserted in complex devices without disturbing their operation. The geometry of the probe can easily be modified to adapt to a particular priming device without requiring any modification of its operating principle.

Finally, as a result of its analog behaviour, the device makes it possible to diagnose not only the overall operation of the final element in the explosive priming chain, but also the operation of each of the components of said final element.

What is claimed is:

1. A device for controlling the priming of a pyrotechnic device incorporating a detonator that comprises at least one charge and a system for igniting said charge, means for supplying a high voltage electric pulse to the detonator, means for positioning the detonator with respect to an explosive charge and applying same to said charge, wherein a control probe is positioned to the rear of the detonator and is applied against the same, said probe comprising a film having two faces of a biaxially stretched polymer having a polarized zone, an electrode connected to each face of the polarized zone and connection means for connecting each electrode to a measuring device.

2. A device according to claim 1, wherein the biaxially stretched polymer is polyvinylidene fluoride.

3. A device according to claim 1, wherein the electrodes are made from copper or aluminium.

4. A device according to claim 1, further characterized by an insulating layer deposited on each of the faces of the film.

5. A device according to claim 4, wherein the insulating layer is made from unpolarized polyvinylidene fluoride.

6. A device according to claim 1, wherein the means for positioning the detonator with respect to the explosive charge and for applying it to said charge comprise a box surrounding the detonator and closed by a cover, a spring positioned between the cover and the detonator, and a pellet inserted between the detonator and the spring.

* * * * *